United States Patent Office 2,926,146
Patented Feb. 23, 1960

2,926,146

ION EXCHANGE MATERIAL FROM BARK AND FORMALDEHYDE

Charles Roland McCully, Chicago, Ill., assignor to Armour Research Foundation of Illinois Institute of Technology, Chicago, Ill., a corporation of Illinois No Drawing. Application May 28, 1956
Serial No. 587,467

11 Claims. (Cl. 260—2.2)

The instant invention relates to a method of preparing a resin-bearing material, and more particularly, to a method of preparing an ion exchange resin-bearing material.

Although the instant invention may find application in various fields, it is uniquely adapted for the production of an ion exchange resin-bearing material possessing the required properties for use in ordinary ion exchange processes, such as water softening, and the instant invention will be described primarily in connection with uses of this type. In particular, the instant invention relates to the production of a material bearing a tannin-formaldehyde resin.

It has been known for some time that tannin (and particularly certain species such as the quebracho extract) could be condensed with formaldehyde and an acid to form an insoluble resin. Such a resin reportedly has ion exchange properties. These properties can be increased by attaching sulfonic acid groups or by liberating some weak hydroxyl groups. The former is accomplished by reacting the resin with a sulfite such as sodium bisulfite and the latter is accomplished by reacting the resin with dilute sodium hydroxide. The tannin resins thus produced leave something to be desired in that they do not possess stable physical structures and tend to wash away and to suffer attrition, for example, when used in the ordinary water softening operation. If the tannin resins are condensed to form a dense hard resin, such resin will not have sufficient numbers of available exchange groups to function adequately as an ion exchange resin.

As is also well known, bark from trees contains more or less tannin depending upon the particular species, and there are different species of tannins. Tannins are, in general, a group of astringent, aromatic, acidic compounds found in various plants and trees, and particularly in the bark of trees. Tannins contain phenolic hydroxyl groups and the tannin species of principal interest here is the so-called "catechol" tannins which are known resin formers with formaldehyde. In ordinary practice heretofore employed, the tannins are extracted from the bark and used in their substantially pure extracted form for reaction with formaldehyde, if it is desired to prepare a resin therefrom.

In contrast, in the instant invention it has been found that unique advantages may be obtained by employing the bark itself, that is, bark which has not previously ben extracted, containing the usual relatively small proportion of tannin, and by reacting such bark in particulate form with formaldehyde under certain specific reaction conditions. Bark itself being composed primarily of cellulose does not have any appreciable ion exchange properties, and it might be expected that the presence of excessive amounts of cellulose would serve to subtract from rather than add to the ion exchange properties of a tannin formaldehyde resin. Whatever effect the bark would be expected to have, it is certain that one should expect only a diluting effect on the resin and there would be no reason to assume that any improvement could be obtained. Just the opposite is true, however. Unique advantages in resin stability, improved ion exchange, wash-resistance, etc. have resulted from the practice of the instant invention.

It is, therefore, an important object of the instant invention to provide an improved resin-bearing material.

It is a further object of the instant invention to provide an improved ion exchange resin-bearing material obtained from inexpensive sources and possessing improved properties for use in commercial ion exchange.

Other and further objects, features and advantages of the present invention will become apparent to those skilled in the art from the following detailed disclosure thereof.

An important aspect of the instant invention consists in a method of preparing a resin-bearing material which comprises the steps of admixing bark in particulate form and aqueous formaldehyde, heating the mixture rapidly from substantially room temperature to 75–95° C., and then acidifying the mixture at least to pH 1 with continued heating to complete resin formation in the bark.

Although it is not desired to limit the instant invention to any particular theory, a key to the instant invention is believed to reside in the rapid heating of the bark in the presence of resin forming formaldehyde, so as to obtain an initial uniform distribution of the tannin within the bark without excessive leaching of the tannin out of the bark and into aqueous solution (whereupon it is converted to an insoluble resin that is not attached to the bark and is lost for purposes of the instant invention). It is believed that the formaldehyde serves to form a permeable film around the bark particles which resists to some extent the extraction or leeching of tannin by the warm water solution, but does not prevent the redistribution of tannin within the bark particles and the subsequent resinification thereof by formaldehyde penetration of the bark particles, catalyzed by the acid.

A general idea of the complexity of the phenomena here involved may be appreciated when one considers that the bark comprises cellulose fibers. The surface area of cellulose fibers is immense. The fibers are understood to comprise elongated interwoven fibrils about 1.4 microns thick; the fibrils are bundles of interwoven ultrafibrils which are 0.1–0.3 micron thick; the ultrafibrils are in turn composed of micells also assumed to be interwoven along slender threads; and the micells may be pictured as ropes comprising 100 to 150 cellulose molecular chains arranged in a crystal lattice. The micells are understood to have a diameter of about 60 to 70 Angstrom units and a length of at least 600 Angstrom units. The space between the cellulose molecular chains is very small, sometimes as small as 10 to 15 Angstrom units, and the problem of moving tannin molecules or resin molecules is thus greatly complicated. Moreover, the cellulose chains contain hydroxyl groups which may be chemically activated under certain conditions.

In bark, the problem is further complicated because the general uniformity of cellulose structure possessed in the wood portion of a tree is not present in bark and a substantial number of other ingredients such as tannins, lignins, etc. are present in the bark in various forms. It is believed that one of the important features of the instant invention is based upon a discovery of the necessity for redistributing the tannin in the bark before accomplishing actual resinification. Such redistribution of the tannin is accomplished preferably without any leaching of the tannin out of the bark and into solution in the aqueous environment.

It will also be appreciated that barks containing extremely high concentrations of tannins are not particularly well adapted for use in the instant invention, because definite use of the cellulose content of the bark is contemplated as a carrier providing the immense surface necessary in adequate ion exchange materials. In general, the barks used in the practice of the instant invention may have tannin contents ranging from a minimum effective amount of about 1% to a maximum amount of about 20%, above which the beneficial effects of the cellulose present appear to be materially reduced. Although barks such as the bark of Douglas fir, pine trees, etc. containing around 7% tannins may be used in the practice of the instant invention, it has been found generally that a minimum of about 10% (catechol) tannins by weight should be present in the bark if it is to obtain the most advantageous results in the practice of the instant invention. A maximum of about 15% tannins is also preferred; and the best results in the practice of the invention are obtained using hemlock bark (about 12-14% tannins).

The bark is preferably ground down to approximately sawdust size or to a relatively fine particulate form in order to facilitate carrying out the reaction and certain considerations are involved with respect to the actual physical character of the bark. In other words, if the bark has been dried, it will be appreciated that it will take longer for the tannin to be redistributed therein. On the other hand, if the bark has been washed considerably the tannin content may be lower and more rapid heating may be desired to minimize further tannin loss. In general, the reaction conditions described hereinafter are preferred for use with substantially untreated or undried bark that has merely been removed from the logs and ground into particulate form. The bark is referred to in the proportions hereinafter given on a dry weight basis.

Approximately 1 part by weight of bark is formed into a slurry by admixture with a minimum of approximately 1 part by weight of aqueous formaldehyde to a maximum of approximately 20 parts by weight of aqueous formaldehyde. Preferably about 2 to about 5 parts of aqueous formaldehyde is used for each part of bark (on a dry weight basis). The aqueous formaldehyde used may have concentrations ranging from a practical minimum of about 1% to a practical maximum of about 40%. Preferably the formaldehyde content is within the range of about 1 to about 30% of the bark. As used herein, the terms "parts" and "percent" mean parts and percent by weight unless otherwise designated.

The resulting slurry of bark in particulate form in aqueous formaldehyde (which is ordinarily prepared at substantially room temperatures) is then heated rapidly. Rapid heating is a key to the instant invention, because it is desired to effect a redistribution of the tannin only within the bark structure itself and not a leaching of the tannin out of the bark structure with the heated aqueous medium surrounding the bark. As will be appreciated, the water has the simplest molecules present and it can thus penetrate the cellulose structure most rapidly causing swelling of the fibrous material and softening or dissolving of the tannins; and the formaldehyde would also tend to penetrate the fibrous material rapidly because of its simple formula except that the formaldehyde reacts with the tannin upon contacting the same and forms a resinous membrane which tends to resist (at least temporarily) flow of dissolved tannin outwardly from the bark into the aqueous solution. By rapid heating at a rate of at least about 2° C. per minute it is possible to effect the desired redistribution of tannin within the bark without extracting an appreciable amount of tannin from the bark. The rate of heating should not exceed about 10° C. per minute, or the tannin may not have sufficient time to be redistributed in the bark, before the accelerated resinification process will have prevented further travel of the tannin within the bark.

The rapid heating is carried out from substantially room temperature to at least about 75° C. and preferably at least about 85-95° C. Then the material is acidified from the original pH of 5-8 (which is substantially neutral) to a pH of at least as low as 1 and heating is continued to complete the resin formation in the bark. As will be appreciated, the formaldehyde reacts comparatively slowly with the tannin in the absence of the acid catalyst, but the reaction is greatly accelerated when the aqueous formaldehyde is acidified to as low a pH as 1. Any strong inorganic acid may be used to carry out the acidification process, such as hydrochloric acid, sulfuric acid, phosphoric acid, etc., but hydrochloric acid is preferred and it is added preferably in amounts ranging from about 0.5 to 10% of the weight of the bark present in the aqueous slurry. Thorough mixing is carried out during the acidification process to eliminate localized heating in the slurry, and the temperature of the slurry is maintained at least at 75-95° C. for a minimum of an additional 5 to 10 minutes and preferably for as much as 30 minutes in order to complete the resin formation in the bark.

Next the reacted bark is separated from the aqueous solution by suitable draining or filtration and washed, and it is found that the resin has very good ion exchange properties in this form (or the resin may be dried prior to use as an ion exchange resin).

In carrying out the initial heating operation, it will be appreciated that heating can be carried to temperatures as high as perhaps 130° C., if a pressure reaction vessel is employed, but in the practice of the instant invention it is preferable not to require the use of pressure and, accordingly, initial heating is carried out most preferably to just about the boiling point of the aqueous medium, or about 95° C.

The ion exchange capacity of the thus reacted bark may be greatly increased, however, by carrying out a subsequent sulfiting reaction which involves heating the resulting material (the reacted bark) in particulate form with an aqueous sulfite solution. The sulfite used may be any sulfite salt but is preferably an alkali metal bisulfite such as sodium bisulfite. For example, the resulting bark is admixed with 1 to 10 times its weight of 5 to 40% sodium bisulfite aqueous solution and the resulting slurry is heated at 90 to 100° C. (and to as high as 130° C. if a pressure vessel is used) for from 15 minutes to an hour depending upon the temperature and sulfite concentration until the sulfiting reaction is completed and the product is then washed and dried.

Another aspect of the instant invention resides in the discovery of certain advantages which can be obtained by hot pressing the bark particles (preferably before rather than after sulfiting) after resin formation has been completed. In other words, after heating the bark and aqueous formaldehyde to approximately 95° C. and addition of the acid to complete resin formation in the bark, the bark particles may next be hot pressed to effect curing of the resin therein. This curing is conversion of the resin to a thermoset resin, as contrasted to the generally thermoplastic resin that results from acidification at approximately 100° C. In carrying out the hot pressing operation pressures in the range from 1000 to 10,000 pounds per square inch may be used at temperatures of 130° C. to 150° C. (for holding times of from several minutes up to 20 minutes). Resulting hot pressed material is, in effect, molded material since it is subjected to the normal hot pressing molding operation for thermosetting resins. The material is then broken up again into finely divided particulate material, again of approximately sawdust size such as that hereinbefore described, and this material may then be reacted with the sulfite using the reaction conditions hereinbefore described in order to obtain a sulfited resin having extremely high ion exchange capacity.

Specific examples of the invention may be used to demonstrate the same. For example, in a first demonstration normally damp ground bark is added to an aqueous formaldehyde solution in an amount sufficient to give 4 parts of water per part of bark. The solution is a 20% aqueous formaldehyde solution. The resulting slurry is heated rapidly from room temperature (i.e. about 40° C.) to approximately 95° C. (in 20 minutes) and hydrochloric acid in an amount corresponding to 2.5% of the dry weight of the bark is added and the temperature of 95° C. is maintained for an additional 20 minutes. The resulting bark is drained and washed and then admixed with 4 parts per part of dry bark of a 5% aqueous sodium bisulfite solution and heated in a pressure reactor at 130° C. for 30 minutes. The bark is then drained and washed and dried and it is found that it has very high ion exchange capacity.

If, instead of the foregoing procedure, the bark is hot pressed at 140° C. and 4000 lbs. per square inch for 20 minutes and then broken down into particles again, before the sulfiting reaction is carried out, and the same sulfiting reaction conditions are employed then, it is found that even greater ion exchange capacity is obtained in the resin. Moreover, it is found that the bark which has been subjected to the hot pressing step (followed by sulfiting) has superior resistance to attrition and washing during ordinary water softening use and has superior resistance to general deterioration (which might be caused by decay of the fibrous cellulose component, if hot pressing is not carried out).

It will also be noted that the foregoing procedure may be altered by adding the hydrochloric acid at the time the aqueous formaldehyde solution is added to the bark, followed by rapid heating at a rate of at least 2° C. per minute. For example, by heating rapidly from room temperature to about 95° C. at a rate of 3° C. per minute using this procedure it is possible to obtain ion exchange properties which are about 30% poorer than those obtained adding the acid after the temperature of 95° C. has been reached. Nevertheless, the ion exchange properties are better in many respects than those obtained heretofore and this is primarily a result of the rapid heating which prevents loss of the tannin, even through the early addition of the acid may tend to cause premature resin formation in the bark before the optimum distribution of tannin can be accomplished.

As another demonstration, 1 part of dry bark is admixed with 4 parts of a 2.6% aqueous formaldehyde solution which is rapidly heated from room temperature to 95° C. (in about 20 minutes) and then acidified by the addition of HCl in an amount corresponding to 1.7% of the dry bark weight, followed by heating for another 20 minutes. The resulting bark is drained and washed and found to have ion exchange properties. In addition, it may also be hot pressed and/or sulfited using the procedure just described in order to obtain improved ion exchange capacity, but the ion exchange capacity is generally less than that obtained in the previous demonstration, in each case, hemlock bark is used. Using Douglas fir bark or pine tree bark, it is found that a lower ion exchange capacity is obtained, but the resulting product has distinctly advantageous ion exchange properties. Oak, chestnut, redwood, etc. barks may also be used.

If the procedure just demonstrated is altered by the addition of the HCl to the bark and aqueous formaldehyde solution at room temperature, followed by rapid heating at a rate of at least 2° C. per minute from room temperature to 95° C. (in about 25 minutes) and the resulting material is sulfited in the manner hereinbefore described by heat-reacting a bisulfite with the treated bark, the resulting material is found to have about 30% less ion exchange capacity than the correspondingly treated bark of the last mentioned demonstration (i.e., adding the acid after the temperature of 95° C. has been reached). Again, the results obtained do indicate superior ion exchange capacity and this is believed to be caused primarily by the rapid heating which (notwithstanding the presence of the acid catalyst) effects redistribution of tannin within the bark without an appreciable loss thereof through leaching.

The hot pressing operation is a conventional operation for thermosetting mold materials and the sulfiting reaction is a conventional sulfiting reaction, although these particular reactions in each case bring about distinct improvements in the practice of the instant invention using bark prepared as described herein.

If bark is treated with, for example, boiling aqueous formaldehyde so as to almost instantaneously obtain temperatures in the neighborhood of 95° C., the resulting material does not possess the ion exchange capacity obtained in the practice of the instant invention. This further establishes a basis for the theory that redistribution of the tannin within the bark structure is an essential feature of the instant invention.

It will be understood that modifications and variations may be effected without departing from the spirit and scope of the novel concepts of the present invention.

I claim as my invention:

1. A method of preparing a resin-bearing material which comprises the steps of admixing previously untreated bark of 1 to 20% tannin content in particulate form and aqueous formaldehyde, heating the mixture rapidly at a rate of between 2° and 10° C. per minute from substantially room temperature to 75–95° C., and then acidifying the mixture at least to pH 1 with continued heating to complete resin formation in the bark.

2. A method of preparing a resin-bearing material which comprises the steps of admixing previously unextracted bark of 1 to 20% tannin content in particulate form and aqueous formaldehyde, heating the mixture rapidly at a rate of between 2° and 10° C. per minute from substantially room temperature to 75–95° C., then acidifying the mixture at least to pH 1 with continued heating to complete resin formation in the bark, and next hot pressing the resultant bark particles to cure the resin therein.

3. A method of preparing a resin-bearing material which comprises the steps of admixing previously untreated bark of 1 to 20% tannin content in particulate form and aqueous formaldehyde, heating the mixture rapidly at a rate of between 2° and 10° C. per minute from substantially room temperature to 75–95° C., then acidifying the mixture at least to pH 1 with continued heating to complete resin formation in the bark, next hot pressing the resultant bark particles to cure the resin therein, and finally sulfiting the material by heating the resulting material in particulate form with an aqueous sulfite solution.

4. A method of preparing a resin-bearing material which comprises the steps of admixing previously untreated bark of 1 to 20% tannin content in particulate form and aqueous formaldehyde, heating the mixture rapidly at a rate of between 2° and 10° C. per minute from substantially room temperature to 75–95° C., then acidifying the mixture at least to pH 1 with continued heating to complete resin formation in the bark, and finally sulfiting the material by heating the resulting material in particulate form with an aqueous sulfite solution.

5. A method of preparing a resin-bearing material which comprises the steps of admixing previously unextracted bark of 1 to 20% tannin content in particulate form containing 1–20% tannin and 1–40% aqueous formaldehyde at pH 5–8, heating the mixture rapidly at a rate of between 2° and 10° C. per minute from substantially room temperature to 75–95° C., and then acidifying the mixture at least to pH 1 with continued heating to complete resin formation in the bark.

6. A method of preparing a resin-bearing material which comprises the steps of admixing previously untreated bark of 1 to 20% tannin content in particulate form containing 1–20% tannin and 1–40% aqueous formaldehyde, heating the mixture rapidly at a rate of between 2° and 10° C. per minute from substantially room temperature to 75–95° C., then acidifying the mixture at least to pH 1 with continued heating to complete resin formation in the bark, next hot pressing the resultant bark particles to cure the resin therein.

7. A method of preparing a resin-bearing material which comprises the steps of admixing previously untreated bark of 1 to 20% tannin content in particulate form containing 1–20% tannin and 1–40% aqueous formaldehyde, heating the mixture rapidly at a rate of between 2° to 10° C. per minute from substantially room temperature to 75–95° C., then acidifying the mixture at least to pH 1 with continued heating to complete resin formation in the bark, and finally sulfiting the material by heating the resulting material in particulate form with an aqueous sulfite solution.

8. A method of preparing a resin-bearing material which comprises the steps of admixing previously unextracted bark of 1 to 20% tannin content in particulate form containing 1–20% tannin and 1–40% aqueous formaldehyde, heating the mixture rapidly at a rate of between 2° to 10° C. per minute from substantially room temperature to 75–95° C., then acidifying the mixture at least to pH 1 with continued heating to complete resin formation in the bark, next hot pressing the resultant bark particles to cure the resin therein, and finally sulfiting the material by heating the resulting material in particulate form with an aqueous sulfite solution.

9. A method of preparing a resin-bearing material which comprises the steps of admixing previously untreated bark of 1 to 20% tannin content in particulate form and aqueous formaldehyde, then acidifying the mixture at least to pH 1 with rapid heating thereof from substantially room temperature to 85–95° C. at a rate of 2° C. and 10° C. per minute.

10. A method of preparing a resin-bearing material which comprises the steps of admixing previously untreated bark of 1 to 20% tannin content in particulate form and aqueous formaldehyde, heating the mixture rapidly at a rate of between 2° to 10° C. per minute from substantially room temperature to at least 75° C., and then acidifying the mixture at least to pH 1 with continued heating to complete resin formation in the bark.

11. A cation exchange resin prepared by the method of claim 1.

References Cited in the file of this patent

UNITED STATES PATENTS

| 2,214,689 | Burrell | Sept. 10, 1940 |
| 2,575,518 | Holmes | Nov. 20, 1951 |
| 2,773,847 | Pauley | Dec. 11, 1956 |

FOREIGN PATENTS

| 474,361 | Great Britain | Oct. 25, 1937 |

OTHER REFERENCES

Bhatnagar: J. Appl. Chem., 1, p. 517–522 (November 1951).